United States Patent [19]
Shibahata et al.

[11] Patent Number: 6,053,291
[45] Date of Patent: Apr. 25, 2000

[54] DAMPER OF A TYPE WITH A VARIABLE DAMPING FORCE

[75] Inventors: Yasuji Shibahata; Nobuharu Kuriki, both of Saitama-ken, Japan

[73] Assignee: Honda Giken Kogyo Kabushiki Kaisha, Tokyo, Japan

[21] Appl. No.: 08/940,979

[22] Filed: Sep. 30, 1997

[30] Foreign Application Priority Data

Dec. 27, 1996 [JP] Japan ................................... 8-349477

[51] Int. Cl.[7] ................................................. F16F 11/00
[52] U.S. Cl. ..................... 188/271; 188/266.1; 188/280; 280/5.519; 267/134; 267/196
[58] Field of Search ................................... 267/129, 134, 267/196, 200, 64.12; 188/67, 267, 271, 272, 266.1, 300, 280; 280/5.515, 5.519

[56] References Cited

U.S. PATENT DOCUMENTS 5,277,281  1/1994  Carlson et al. .......................... 188/267
5,392,881  2/1995  Cho et al. ............................... 188/267

FOREIGN PATENT DOCUMENTS 3-84447  8/1991  Japan .
5-60160  3/1993  Japan .................................... 188/267

Primary Examiner—Robert J. Oberleitner
Assistant Examiner—Robert A. Siconolfi
Attorney, Agent, or Firm—Armstrong, Westerman, Hattori, McLeland & Naughton

[57] ABSTRACT

A small-sized damper is provided which enables to effectively vary the damping force of a damper even in a region in which the moving speed of a rod is small. On one of a damper main body and a rod which is inserted into the damper main body, there are mounted a magnet coil having a winding axial line which is coaxial with the damper, and magnetizable attracting members. By electric charging to the magnet coil, the magnetizable attracting members are attracted into contact with the other of the damper main body and the rod.

15 Claims, 6 Drawing Sheets

FIG. 6A
FIG. 6B
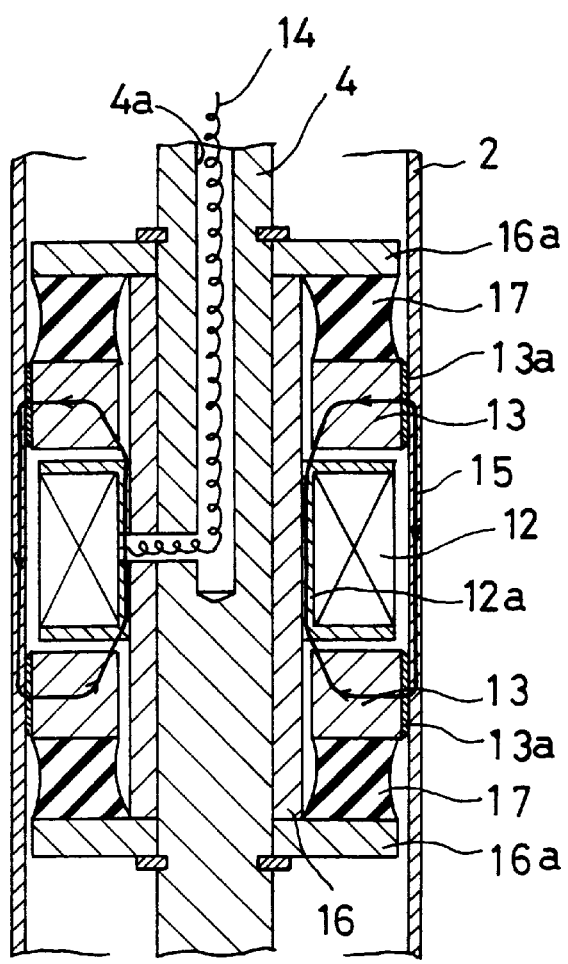
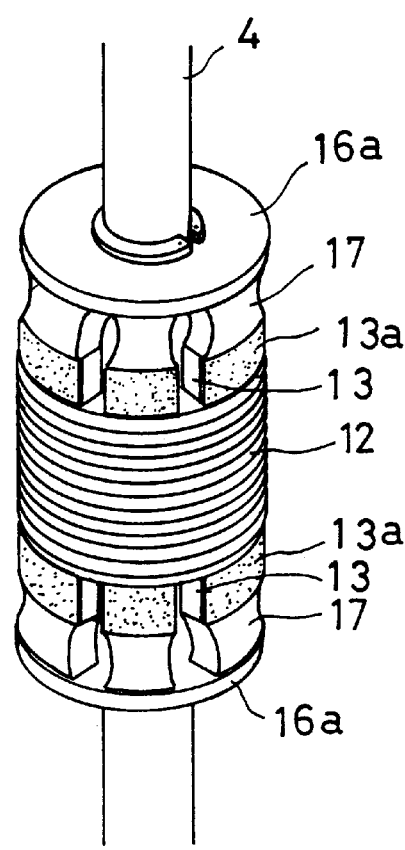

DAMPER OF A TYPE WITH A VARIABLE DAMPING FORCE

BACKGROUND OF THE INVENTION

1. Field of the Invention

The present invention relates to a damper of a type with a variable damping force which is built in a suspension system of a vehicle such as a motor vehicle.

2. Description of the Related Art

A damper which is built in a suspension system of a vehicle is provided with a cylindrical damper main body, and a rod which is inserted into the damper main body so as to be relatively movable in an axial direction. One of the damper main body and the rod is connected to an unsprung member and the other of the damper main body and the rod is connected to a sprung member.

As the kind of dampers, there can be listed a hydraulic damper which has that oil chamber inside a damper main body into which a piston to be connected to a rod is inserted, and a friction damper which is arranged that a rod is fit into a damper main body to thereby frictionally contact the two members together.

In the hydraulic damper, an orifice is formed in the piston to generate a damping force by a flow resistance of oil which flows through the orifice. Conventionally, the damping force is varied by changing the diameter of the orifice.

In the friction damper, on the other hand, as disclosed in Japanese Published Unexamined Utility Model Registration Application No. 84447/1991, the following arrangement is also known. Namely, there is mounted on a damper main body an actuator which is made up of a magnet coil with a winding axial line (i.e., an axial line around which the magnet coil is wound) which is at right angles to an axial line of the damper, and a piston which comprises a magnet to be urged towards a rod upon charging of electricity (or by electric charging) to the magnet coil.

FIG. 10 is a graph showing a change in the correlation between the moving speed of the rod and the damping force depending on the orifice diameter in the hydraulic damper. In the graph, line "a" shows the change in case where the orifice diameter is large, and line "b" shows the change in case where the orifice diameter is small. As can be clearly seen in this graph, in a region in which the moving speed of the rod is small, the damping force does not change so much even if the orifice diameter is changed. Here, the moving speed of the rod which occurs at the time of normal running of the vehicle falls within a low-speed region as shown by "A" in FIG. 10. Therefore, in the conventional system in which the orifice diameter is changed, it is not easy to effectively change the damping force of the hydraulic damper at the time of normal running of the vehicle.

Further, in the friction damper described in the above-described Japanese Published Unexamined Utility Model Registration Application No. 84447/1991, due to the fact that the direction of the winding axial line of the magnet coil lies in the direction at right angles to the axial line of the damper, the actuator protrudes outwards of the damper main body. It has therefore a disadvantage in that the damper becomes large in size.

In view of the above-described points, the present invention has an object of providing a damper of a type with a variable damping force which, without enlarging the damper, can effectively change the damping force even in the region in which the moving speed of the rod is small.

SUMMARY OF THE INVENTION

In order to attain the above and other objects, the present invention is a damper of a type with a variable damping force comprising a cylindrical damper main body and a rod which is inserted into the damper main body so as to be relatively movable along an axial line of the damper, wherein one of the damper main body and the rod is provided thereon with: a magnet coil having a winding axial line which is parallel with the axial line of the damper; and a magnetizable attracting member which is magnetized by electric charging to the magnet coil so as to be attracted into contact with the other of the damper main body and the rod.

When the magnetizable attracting member is attracted into contact with said the other of the damper main body and the rod through electric charging to the magnet coil, a damping force by friction can be obtained. The friction force is constant irrespective of the moving speed of the rod. Therefore, even in a region in which the moving speed of the rod is low, the damping force can be effectively varied. In this manner, the switching of the rolling rigidity and the damping characteristics of the vehicle at the time of normal running of the vehicle can be effectively performed.

Further, according to the present invention, since the operation is made by means of an electromagnetic force, the damping force can be switched with a good response. In addition, since the winding axial line of the magnet coil is parallel with the axial line of the damper, it is possible to mount in a compact manner the magnet coil and the magnetizable attracting member on an inner circumferential surface of the damper main body or on an outer peripheral surface of the rod. As a consequence, the damper can be prevented from becoming large in size, and its cost can be made smaller.

Further, if the magnetizable attracting member is provided on both sides, in the winding axial line, of the magnet coil, the friction force can be made large.

Still furthermore, if a resin coating is provided on that sliding surface of the magnetizable attracting member which slides in contact with said the other of the damper main body and the rod, said the other of the damper main body and the rod can advantageously be prevented from being damaged.

In addition, the present invention can be easily applied to a hydraulic damper which has inside the damper main body an oil chamber into which a piston connected to the rod is inserted, and is therefore advantageous in this respect.

Although the magnetizable attracting member may be supported on said one of the damper main body and the rod so as to be slidable in the diametrical direction of the damper, this will result in the following disadvantage. Namely, due to the attracting force at the sliding portion, the attracting force between the magnetizable attracting member and said the other of the damper main body and the rod becomes weak. Or else, due to wear in the sliding portions, there will be generated a clattering noise.

As a solution to this, if the magnetizable attracting member is supported on said one of the damper main body and the rod via an elastic member so as to be movable in a diametrical direction of the damper, or if the magnetizable attracting member is made of a rubber-like magnetic member which is capable of elastically deforming in the diametrical direction of the damper, there exists no sliding portion. Therefore, the above-described disadvantage can advantageously be eliminated.

Further, if the magnetic flux from the magnet coil leaks into said one of the damper main body and the rod, the attracting force between the magnetizable attracting member and said the other of the damper main body and the rod becomes weaker. Therefore, it is preferable to support the magnet coil on said one of the damper main body and the rod via a holder which is made of a non-magnetic member, to thereby prevent the electromagnetic flux from leaking from the magnet coil to said one of the damper main body and the rod.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 6A is a sectional view of an important portion of a third embodiment of the present invention and FIG. 6B is a perspective view thereof;

DETAILED DESCRIPTION OF PREFERRED EMBODIMENTS

Figure 1:
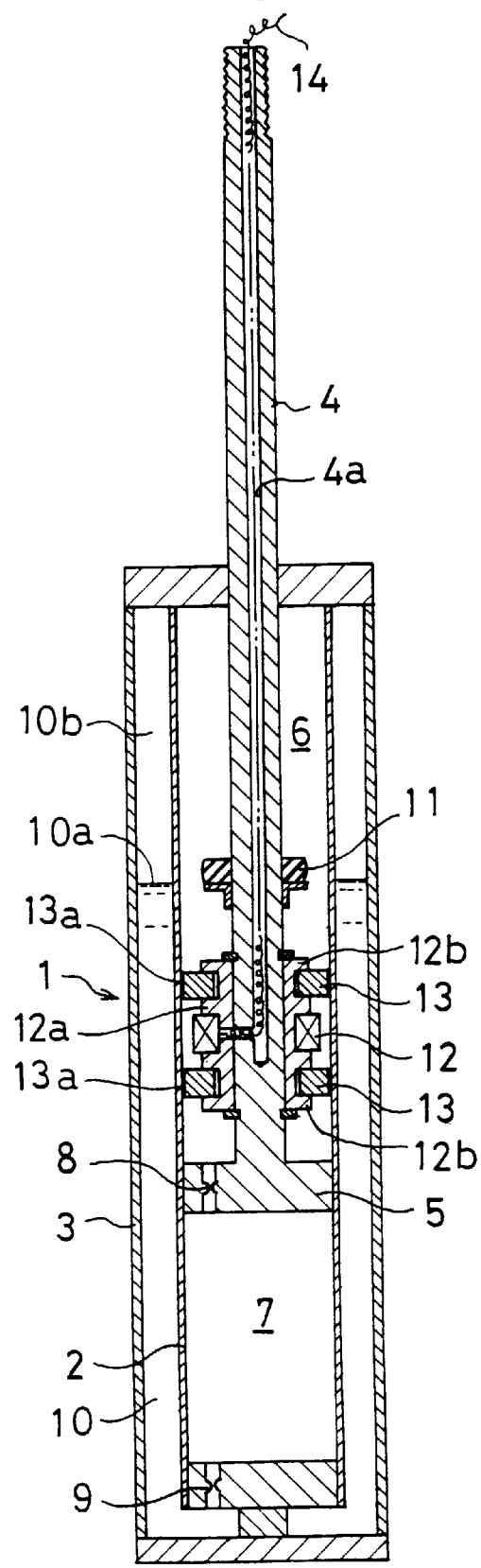
FIG. 1 is a vertical sectional view of a first embodiment of the damper according to the present invention.

FIG. 1 shows a twin-tube type of hydraulic damper for a vehicle such as a motor vehicle. A damper main body 1 of this damper is constituted into a cylindrically shaped double tube construction by means of an inner tube 2 and an outer tube 3. A rod 4 is inserted into the inner tube 2 from an upper side, and a piston 5 is connected to a lower end of the rod 4. An oil chamber which is constituted by an inner space of the inner tube 2 is thus divided into two chambers of an upper chamber 6 and a lower chamber 7. The upper chamber 6 and the lower chamber 7 are communicated with each other by an orifice 8 which is formed in the piston 5. The space between the inner tube 2 and the outer tube 3 is formed into a reserve chamber 10 which is communicated with the lower chamber 7 via an orifice 9. The space above an oil level 10a in the reserve chamber 10 is formed into an air chamber 10b. In the figure, numeral 11 is a rebound stop rubber which is attached to the rod 4.

The hydraulic damper is connected to a suspension arm (not illustrated) at a lower end of the damper main body 1, and is connected to a vehicle body (not illustrated) at an upper end of the rod 4. In an extension stroke in which the piston 5 moves up relative to the damper main body 1, the oil flows from the upper chamber 6 into the lower chamber 7 through the orifice 8. Also, the oil equivalent to the volume of that portion of the rod 4 which has been pulled out of the damper main body 1 in the extension stroke flows from the reserve chamber 10 into the lower chamber 7 through the orifice 9. A damping force is thus generated by the flow resistance of the oil through these orifices 8, 9. On the other hand, in a contraction stroke in which the piston 5 moves down relative to the damper main body 1, the oil flows from the lower chamber 7 into the upper chamber 6 through the orifice 8. Also, the oil equivalent to the volume of that portion of the rod 4 which has come into the damper main body 1 is forced out of the lower chamber 7 into the reserve chamber 10 through the orifice 9. A damping force is thus generated by the flow resistance of the oil through these orifices 8, 9.

Figure 2:
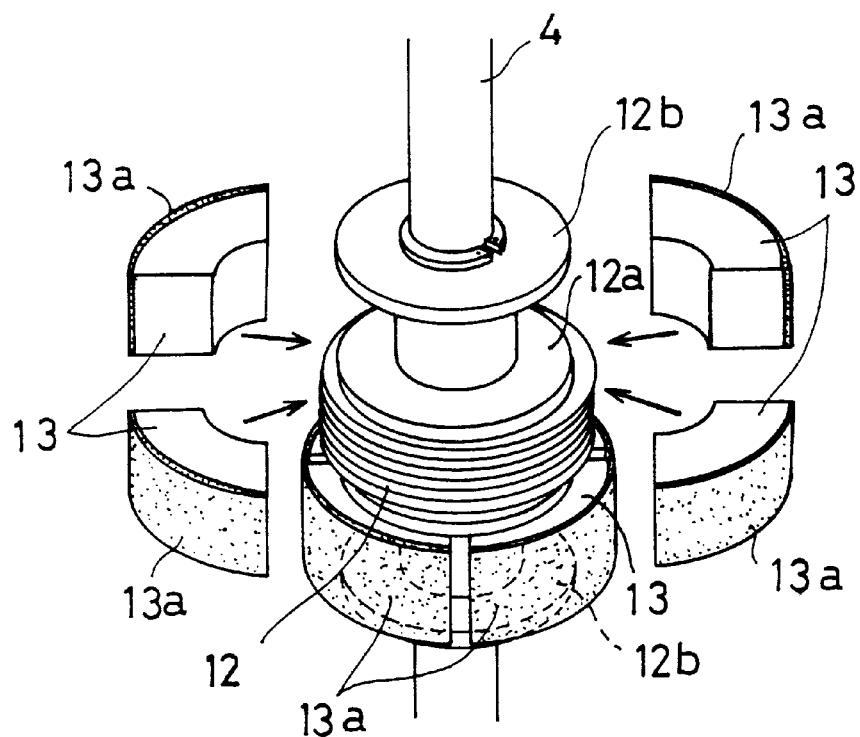
FIG. 2 is a perspective view of an important portion in FIG. 1.

In that portion of the rod 4 which is inserted into the inner tube 2, there is fixed a magnet coil 12 having a vertical winding axial line (i.e., an axial line around which the coil is wound) which is parallel with the axial line of the damper, such that the magnet coil 12 is fit onto an outer surface of the rod 4 at its cylindrical core 12a. In this core 12a there are integrally formed upper and lower pair of yoke portions 12b, 12b in each of which is respectively formed an annular groove. In the annular groove of each of the yoke portions, there are mounted a plurality of circumferentially segmented magnetizable attracting members (i.e., members to have an attraction force upon magnetization) 13, as shown in FIG. 2, so as to be slidable in the diametrical direction of the damper. The magnet coil 12 is charged with electricity (or is electrically charged) via a lead wire 14 which passes through an axial hole 4a in the rod 4.

Figure 3:
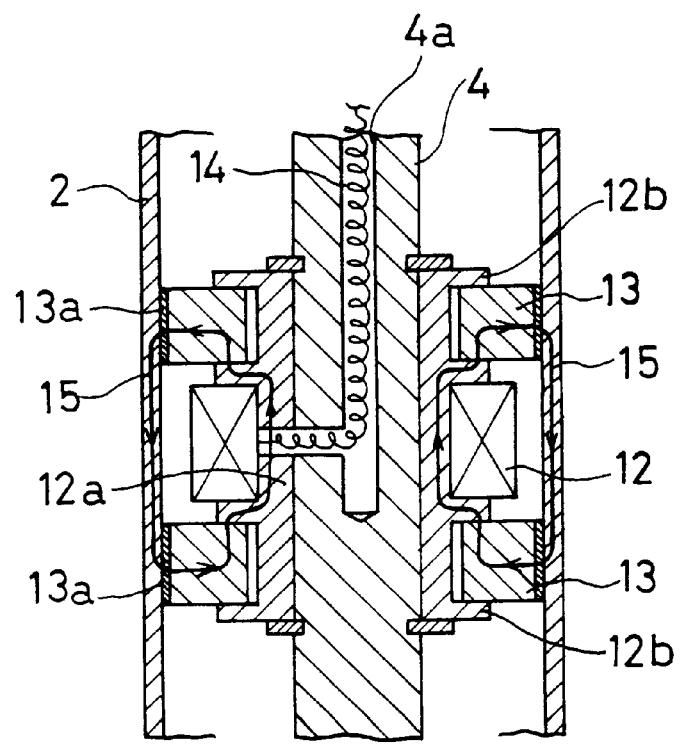
FIG. 3 is an enlarged sectional view of an important portion in FIG. 1.

The magnetizable attracting members 13 are each made of a magnetic member such as iron, or the like. When the magnet coil 12 is charged with electricity, there is formed a closed magnetic circuit 15, as shown in FIG. 3, from the magnet coil 12, one of the upper and lower magnetizable attracting members 13, the inner tube 2, the other of the upper and lower magnetizable attracting members 13, and to the magnet coil 12. The magnetizable attracting members 13 are thus magnetized and attracted into contact with the inner tube 2, whereby a damping force by friction is generated. In order to prevent the inner tube 2 from being damaged, those surfaces of the magnetizable attracting members 13 which slide in contact with the inner tube 2 are coated with a resin coating 13a such as of Teflon (a trade name of PTFE, polytetrafluoroethylene), or the like.

Figure 4:
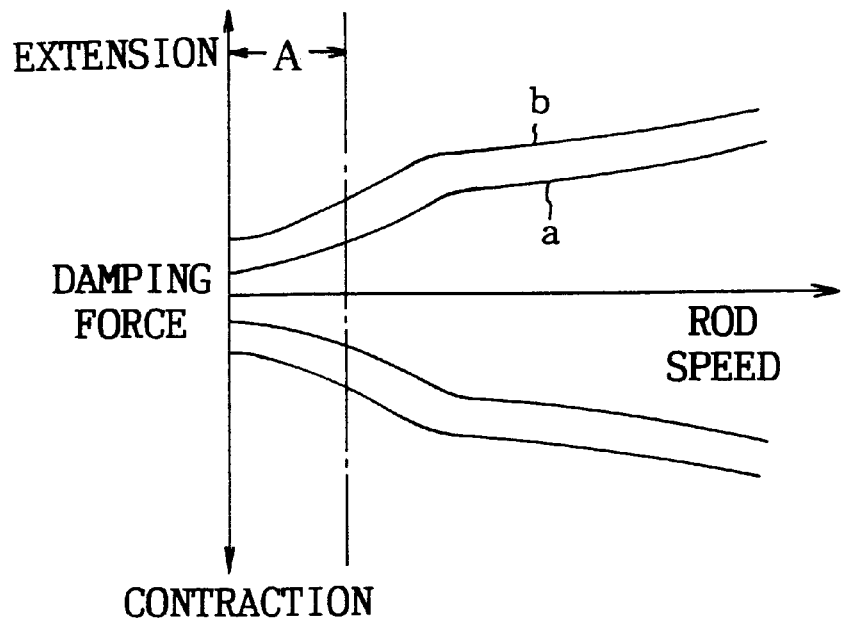
FIG. 4 is a graph showing the change in the damping force as a result of switching on and off of electric charging to a magnet coil.
Figure 10:
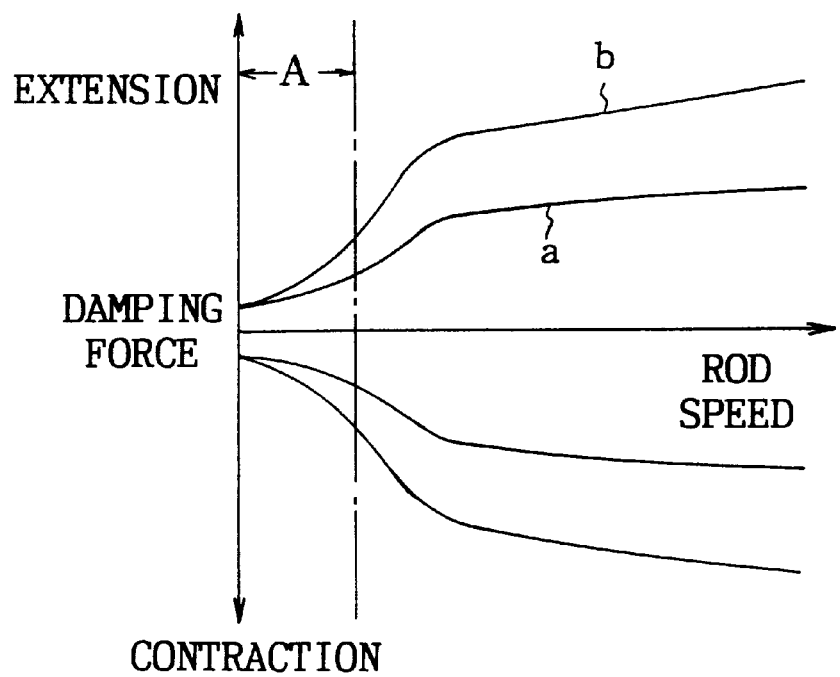
FIG. 10 is a graph showing the change in damping force depending on the diameter of an orifice.

FIG. 4 shows a correlation between the moving speed of the rod 4 and the damping force. In the figure, line "a" shows the correlation when the magnet coil 12 is not charged with electricity, and line "b" shows the correlation when the magnet coil 12 is charged with electricity. The damping force due to friction is constant irrespective of the moving speed of the rod 4. Even at the time of normal running in which the moving speed of the rod 4 falls under the low-speed region as shown by "A" in the figure, the damping force can be varied effectively and with a good response by the switching on and off of the electric charging to the magnet coil 12. Therefore, the rolling rigidity and the damping characteristics of the vehicle at the time of normal running can be effectively switched. In addition, it is also possible to vary the damping force by controlling to increase or decrease the value of electric current to be charged to the magnet coil 12.

Further, since it is enough to mount the magnet coil 12 on the periphery (or outer surface) of the rod 4, the mechanism for varying the damping force can be constituted small in size and cost. Still furthermore, existing hydraulic dampers can be easily modified to a type with a variable damping force.

Figure 5:
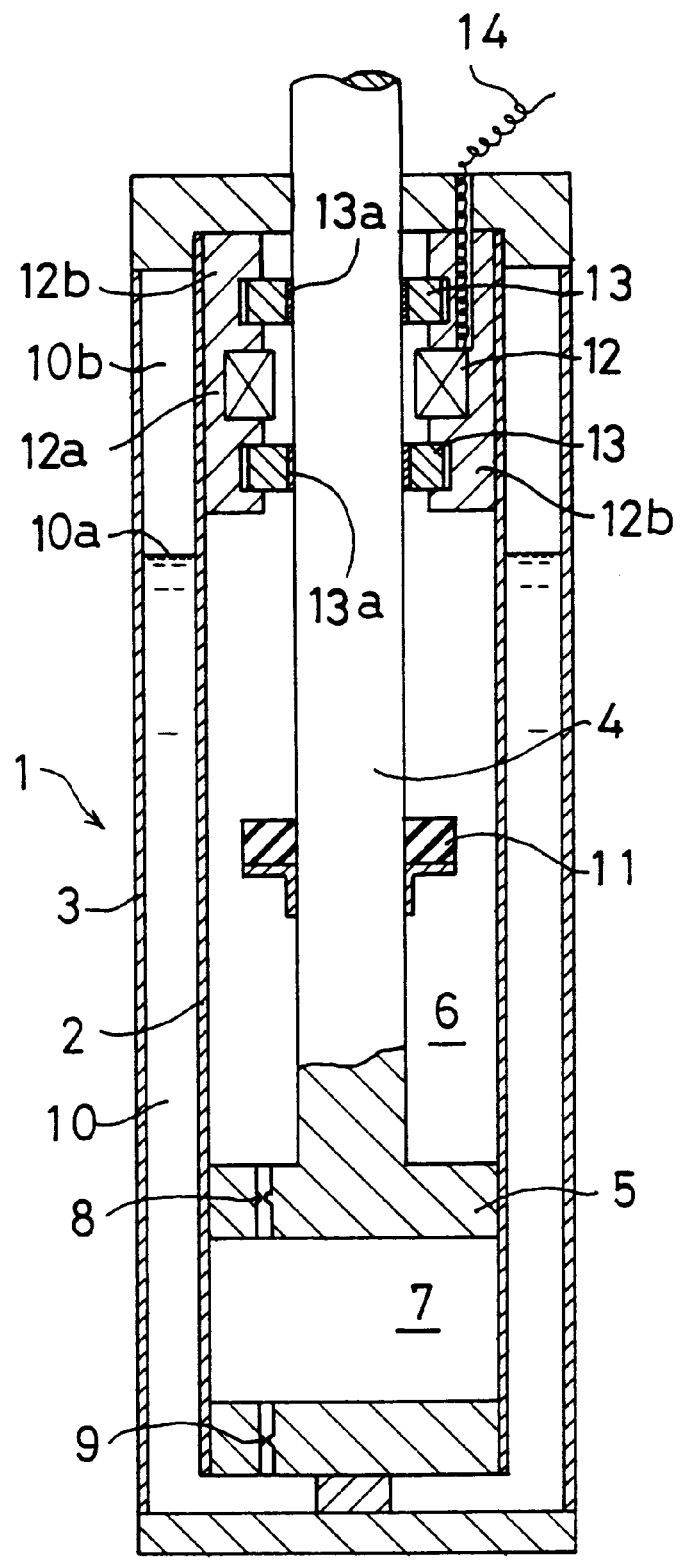
FIG. 5 is a vertical sectional view of a second embodiment of the present invention.

The magnet coil 12 and the magnetizable attracting members 13 may also be mounted on an inner circumferential surface of the inner tube 2, as shown in FIG. 5, so that the magnetizable attracting members 13 can be attracted into contact with the rod 4 by the electric charging to the magnet coil 12.

Furthermore, the magnetizable attracting members 13 may also be provided only on one side of the magnet coil 12.

If the magnet coil 12 is directly fit onto the rod 4 or the inner tube 2 at its core 12a, the magnetic flux from the magnet coil 12 leaks to the rod 4 or to the inner tube 2. As a consequence, the force of attracting the magnetizable attracting members 13 to the inner tube 2 or to the rod 4 becomes weak.

As a solution, in the embodiment shown in FIG. 6A, the following arrangement has been employed. Namely, a cylindrical holder 16 which is made of a non-magnetic member such as a resin or the like is fit onto an outer surface of the rod 4. The magnet coil 12 is fit by means of its core 12a onto an outer surface of the holder 16 so that the leak of the magnetic flux from the magnet coil 12 to the rod 4 can be prevented by the holder 16.

In addition, if the magnetizable attracting members 13 are slidably fit into the annular grooves of the yoke portions 12b as in the above-described embodiments, there is a disadvantage in that the force of attracting the magnetizable attracting members 13 to the inner tube 2 is weakened by the force of attracting the magnetizable attracting members 13 to the yoke portions 12b. In addition, due to the wear in the sliding portions of the magnetizable attracting members 13, there is another disadvantage in that a clattering noise occurs.

As a solution, in the embodiment shown in FIGS. 6A and 6B, the following arrangement has been employed. Namely, on both upper and lower ends of the cylindrical holder 16, there is respectively provided a flange 16a. Elastic members 17 such as rubber or the like, one end of each of which is fixed by baking to each of the magnetizable attracting members 13, is fixed by baking, at its other end, to the flange 16a. It is thus so arranged that the magnetizable attracting members 13 are supported via the elastic members 17 so as to be movable in the diametrical direction of the damper relative to the rod 4. According to this arrangement, the magnetizable attracting members 13 move in the diametrical direction without sliding relative to the other members, with the result that the above-described disadvantages do not occur. In addition, due to the elasticity of the elastic members 17 in the axial direction, it becomes possible to absorb minute vibrations.

Figure 7:
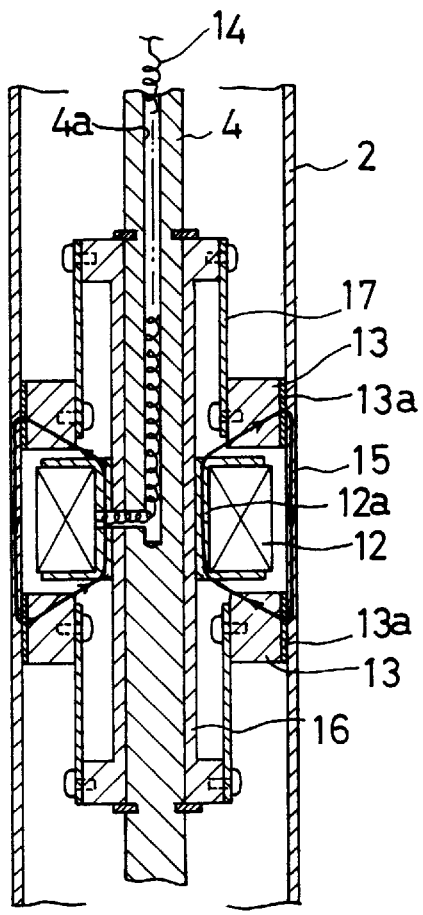
FIG. 7 is a vertical sectional view of an important portion of a fourth embodiment of the present invention.

The above-described elastic members 17 may also be constituted by plate springs as shown in FIG. 7.

Figure 8:
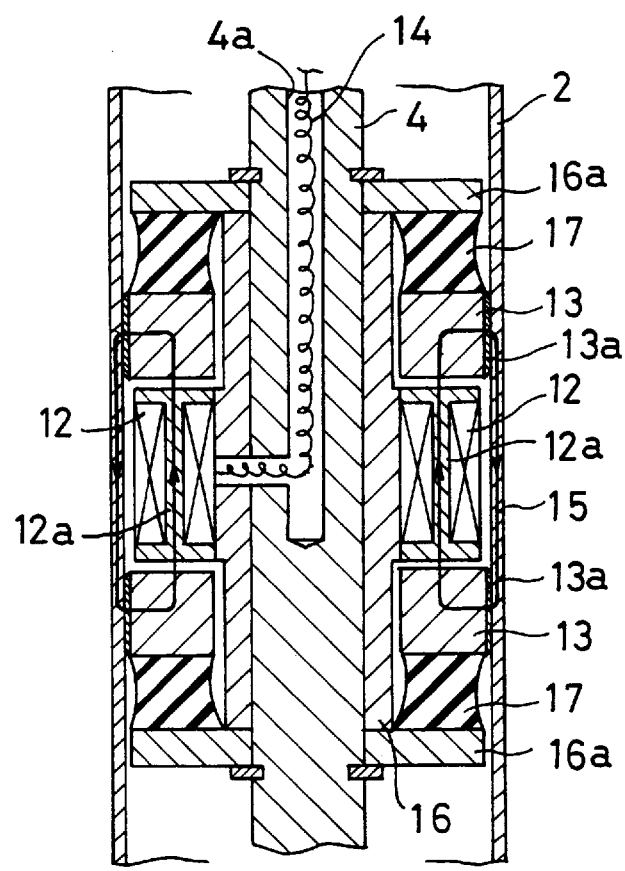
FIG. 8 is a vertical sectional view of an important portion of a fifth embodiment of the present invention.

Further, in the above-described embodiments, the magnet coil 12 is formed into a common single piece which is coaxial with the damper. However, as shown in FIG. 8, a plurality of magnet coils 12 may also be mounted in the circumferential direction about the holder 16 which is formed of a non-magnetic member.

Figure 9:
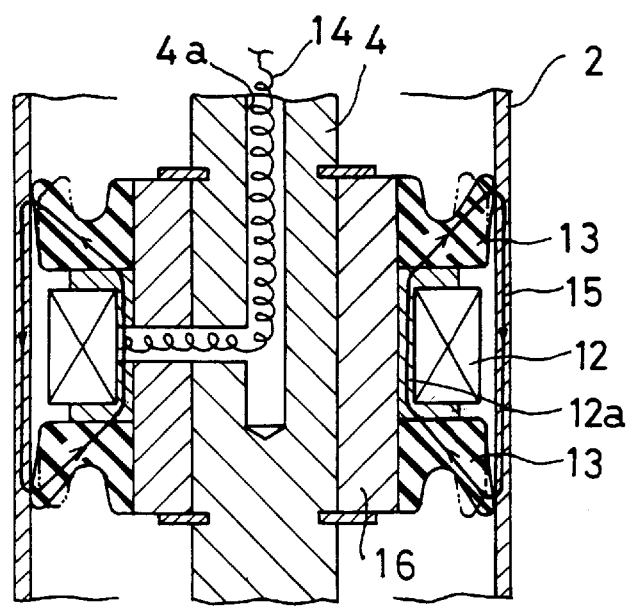
FIG. 9 is a vertical sectional view of an important portion of a sixth embodiment of the present invention.

Still furthermore, in the above-described embodiments, the magnetizable attracting members 13 are constituted by rigid bodies. However, they may also be formed by rubber-like elastic magnetic members which are capable of deforming in the diametrical direction of the damper as in the embodiment shown in FIG. 9. In this embodiment, when the magnet coil 12 is charged with electricity, the magnetizable attracting members 13 are elastically deformed in the diametrical direction of the damper from the state as illustrated by imaginary lines, whereby the magnetizable attracting members 13 are attracted into contact with the inner tube 2.

In the above-described embodiments, the present invention was applied to the twin-tube type of hydraulic damper. However, it can also be applied to a mono-tube type of hydraulic damper. Still furthermore, it can also be applied to a friction damper which is provided with no oil chamber.

It is readily apparent that the above-described damper of a type with a variable damping force meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A damper of a type with a variable damping force comprising a cylindrical damper main body and a rod which is inserted into the damper main body so as to be relatively movable along an axial line of the damper, wherein one of the damper main body and the rod is provided thereon with:

a magnet coil having a winding axial line which is parallel with the axial line of the damper; and a magnetizable attracting member which is magnetized by electric charging to the magnet coil so as to be attracted into contact with the other of the damper main body and the rod.

2. A damper according to claim 1, wherein the magnetizable attracting member is provided on both sides, in the winding axial line, of the magnet coil.

3. A damper according to claim 1, further comprising a resin coating provided on that sliding surface of the magnetizable attracting member which slides in contact with said the other of the damper main body and the rod.

4. A damper according to claim 2, further comprising a resin coating provided on that sliding surface of the magnetizable attracting member which slides in contact with said the other of the damper main body and the rod.

5. A damper according to claim 1, wherein the magnetizable attracting member is supported on said one of the damper main body and the rod via an elastic member so as to be movable in a diametrical direction of the damper.

6. A damper according to claim 2, wherein the magnetizable attracting member is supported on said one of the damper main body and the rod via an elastic member so as to be movable in a diametrical direction of the damper.

7. A damper according to claim 3, wherein the magnetizable attracting member is supported on said one of the damper main body and the rod via an elastic member so as to be movable in a diametrical direction of the damper.

8. A damper according to claim 4, wherein the magnetizable attracting member is supported on said one of the damper main body and the rod via an elastic member so as to be movable in a diametrical direction of the damper.

9. A damper according to claim 1, wherein the magnetizable attracting member is made of a rubber-like magnetic member which is capable of elastically deforming in a diametrical direction of the damper.

10. A damper according to claim 2, wherein the magnetizable attracting member is made of a rubber-like magnetic member which is capable of elastically deforming in a diametrical direction of the damper.

11. A damper according to claim 3, wherein the magnetizable attracting member is made of a rubber-like magnetic member which is capable of elastically deforming in a diametrical direction of the damper.

12. A damper according to claim 4, wherein the magnetizable attracting member is made of a rubber-like magnetic member which is capable of elastically deforming in a diametrical direction of the damper.

13. A damper according to any one of claims 1 through 12, wherein the magnet coil is supported on said one of the damper main body and the rod via a holder which is made of a non-magnetic member.

14. A damper according to any one of claims 1 through 12, wherein the damper is a hydraulic damper having inside the damper main body an oil chamber into which is inserted a piston connected to the rod.

15. A damper according to claim 13, wherein the damper is a hydraulic damper having inside the damper main body an oil chamber into which is inserted a piston connected to the rod.

* * * * *